Oct. 16, 1945.   C. J. T. YOUNG   2,386,998
EYEGLASSES
Filed July 3, 1942
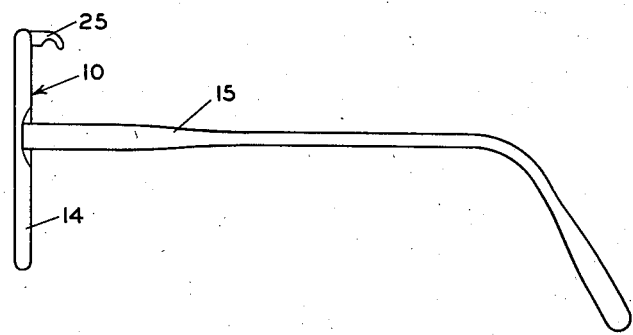
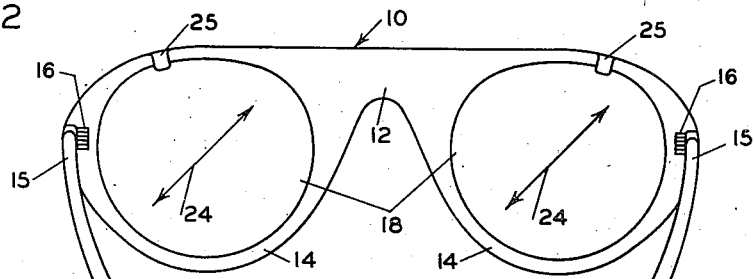
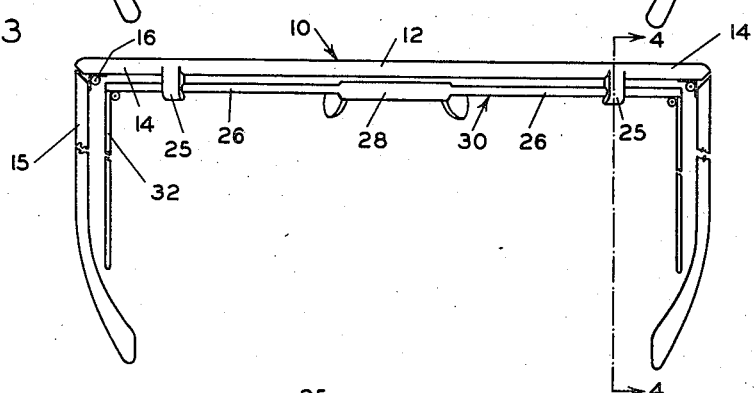
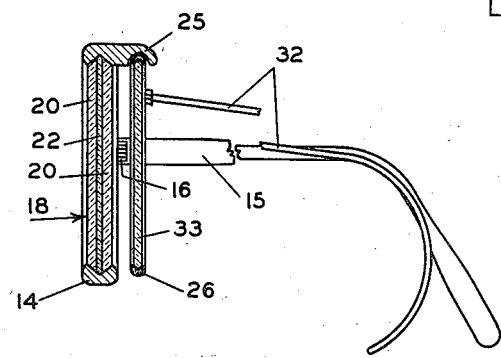
INVENTOR.
Clinton J. T. Young
BY Donald L. Brown
Attorney Patented Oct. 16, 1945

2,386,998

UNITED STATES PATENT OFFICE 2,386,998

EYEGLASSES

Clinton J. T. Young, Cambridge, Mass., assignor to Polaroid Corporation, Cambridge, Mass., a corporation of Delaware Application July 3, 1942, Serial No. 449,600

5 Claims. (Cl. 88—41)

This invention relates to eyeglasses, and more particularly to eyeglasses designed primarily for the protection of the wearer from glare.

It has been proposed that automobiles be equipped with polarizing headlights and that the drivers be provided with suitable analyzing means for blocking polarized light emitted by the headlights of approaching cars. According to one proposal, the light emitted by the headlights may be polarized to vibrate at an angle of 45 degrees to the vertical, and eyeglasses employed as analyzers in such a system should have the polarizing material therein positioned to block such polarized light and with its polarizing axis at 45 degrees to the vertical.

It is desirable to manufacture special polarizing eyeglasses for use in a system such as that above described. Eyeglass frames of the conventional spectacle type will in general be unsatisfactory for use by persons accustomed to wearing glasses for the correction of deficiencies in their eyesight. Supplemental glasses of the fit-over or snap-on type are known in the art, but they require different lenses as well as different frames from glasses of the spectacle type.

It is one object of the present invention to provide eyeglasses with such a frame that they may be worn separately as spectacles or in conjunction with other eyeglasses.

Another object of the invention is to provide eyeglasses of the above type which are provided with means for engaging other glasses worn by the same wearer.

A further object is to provide an eyeglass frame of the spectacle type provided with temples for engaging the ears of the wearer and provided also with rearwardly extending hooks adjacent the top thereof adapted to engage the top of another pair of glasses worn thereunder.

A still further object of the invention is to provide glasses of the above described characteristics having mounted therein lenses comprising light-polarizing material adapted to block light of predetermined polarization characteristics.

Other objects and advantages of the invention will in part be apparent and in part be pointed out in the course of the following description of several embodiments of the invention, which are given as non-limiting examples, in connection with the accompanying drawing, in which:

Figure 1 is a side view of a pair of glasses embodying one form of the invention;

Fig. 2 is a rear view of the glasses shown in Fig. 1;

Fig. 3 is a plan view showing a pair of glasses of the type shown in Fig. 1 worn in conjunction with a second pair of glasses; and Fig. 4 is an enlarged sectional view approximately on the line 4—4 of Fig. 3.

Referring to the drawing, frame 10 is preferably made in one piece and comprises a bridge portion 12 and two lens-retaining rims 14. Temples 15 may be secured thereto as by means of hinges 16. Frame 10 of the glasses of the invention is preferably of uniform thickness even in bridge portion 12, and is not provided with the usual nose-engaging pads.

Within each of lens-retaining portions 14 is a lens 18 which may, as is shown in Fig. 4, be a lamination comprising two sheets of glass 20 and a sheet of light-polarizing material 22, such for example as one of those sold under the trade name "Polaroid." If the glasses shown in the drawing are intended for use in a headlighting system such as that described hereinabove, lenses 18 will preferably be so positioned that the transmission axes of the polarizing material therein will be at an angle of approximately 45 degrees to the horizontal, as is indicated by arrows 24 in Fig. 2.

In accordance with the invention, frame 10 may be provided with a plurality of rearwardly extending hook portions 25 along the upper edge thereof which, as is shown in Figs. 3 and 4, are adapted to rest on the upper portion of rim 26 of a second pair of glasses 30 comprising bridge 28, temples 32 and lenses 33. This arrangement not only secures the two frames together and prevents the annoyance of relative motion therebetween, but also aids in supporting frame 10. The omission of nose pads from frame 10 makes possible a closer fit between the two frames without frictional contact therebetween.

It should be pointed out that although the glasses of the invention have been described in connection with a system of headlight glare reduction employing polarized light, the invention is in no way limited to this specific purpose. Any supplemental lenses may be mounted in the glasses of the invention without departing from the scope thereof. For example, the glasses of the invention without departing from the scope thereof. For example, the glasses of the invention may be used in connection with the viewing of stereoscopic pictures produced by means of polarized light, in which case the lenses therein will be polarizing and will have their respective transmission axes substantially at right angles to each other. Similarly the glasses of the invention may be used for the elimination of glare resulting from reflected sunlight, in which case the lenses therein should comprise polarizers having their transmission axes substantially vertical.

Furthermore, it should be understood that the invention is not limited to use with polarizing lenses, but supplemental lenses of any other type may be incorporated in the frame described.

Since certain changes may be made in the above article, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A spectacle comprising, in combination, a substantially flat frame member of substantially uniform thickness, said frame member comprising a bridge portion and a plurality of lens-retaining portions connected by said bridge portion and defining therewith a nose-engaging slot, the sides of said slot being adapted to bear on the nose of the wearer of said spectacle, a plurality of temples, and a plurality of hook-like elements structurally integral with the upper part of said lens-retaining portions and extending rearwardly therefrom, said hook elements being adapted to rest upon the upper parts of the eye portions of a second pair of eyeglasses worn by the wearer of said spectacle and to cause the weight of said spectacle to be supported at least in part by said second pair of eyeglasses, said flat construction of said frame member facilitating the mounting of said spectacle and said eyeglasses in close proximity without relative friction.

2. A spectacle comprising, in combination, a substantially flat frame member of substantially uniform thickness, said frame member comprising a bridge portion and a plurality of lens-retaining portions connected by said bridge portion and defining therewith a nose-engaging slot, the sides of said slot being adapted to bear on the nose of the wearer of said spectacle, a plurality of temples, and a plurality of hook-like elements structurally integral with the upper part of said lens-retaining portions and extending rearwardly therefrom, said hook elements being adapted to rest upon the upper parts of the eye portions of a second pair of eyeglasses worn by the wearer of said spectacle and to cause the weight of said spectacle to be supported at least in part by said second pair of eyeglasses, the lower side of each of said hook elements being provided with a recess adapted to engage said second pair of eyeglasses and thereby to hold said spectacle and said eyeglasses in readily detachable, substantially rigid relation, said flat construction of said frame member facilitating the mounting of said spectacle and said eyeglasses in close proximity without relative friction.

3. A spectacle comprising, in combination, a substantially flat frame member of substantially uniform thickness, said frame member comprising a bridge portion and a plurality of lens-retaining portions connected by said bridge portion and defining therewith a nose-engaging slot, the sides of said slot being adapted to bear on the nose of the wearer of said spectacle, a light-polarizing lens positioned in each of said lens-retaining portions, a plurality of temples, and a plurality of hook-like elements structurally integral with the upper part of said lens-retaining portions and extending rearwardly therefrom, said hook elements being adapted to rest upon the upper parts of the eye portions of a second pair of eyeglasses worn by the wearer of said spectacle and to cause the weight of said spectacle to be supported at least in part by said second pair of eyeglasses, the lower side of each of said hook elements being provided with a recess adapted to engage said second pair of eyeglasses and thereby to hold said spectacle and said eyeglasses in readily detachable, substantially rigid relation, said flat construction of said frame member facilitating the mounting of said spectacle and said eyeglasses in close proximity without relative friction.

4. A spectacle comprising, in combination a substantially flat frame member of substantially uniform thickness, said frame member comprising a bridge portion and a plurality of lens-retaining portions connected by said bridge portion and defining therewith a nose-engaging slot, the sides of said slot being adapted to bear on the nose of the wearer of said spectacle, a light-polarizing lens positioned in each of said lens-retaining portions, each of said lenses being adapted to transmit polarized light transmitted by the other of said lenses, a plurality of temples, and a plurality of hook-like elements structurally integral with the upper part of said lens-retaining portions and extending rearwardly therefrom, said hook elements being adapted to rest upon the upper parts of the eye portions of a second pair of eyeglasses worn by the wearer of said spectacle and to cause the weight of said spectacle to be supported at least in part by said second pair of eyeglasses, the lower side of each of said hook elements being provided with a recess adapted to engage said second pair of eyeglasses and thereby to hold said spectacle and said eyeglasses in readily detachable, substantially rigid relation, said flat construction of said frame member facilitating the mounting of said spectacle and said eyeglasses in close proximity without relative friction.

5. A spectacle comprising, in combination, a substantially flat frame member of substantially uniform thickness, said frame member comprising a bridge portion and a plurality of lens-retaining portions connected by said bridge portion and defining therewith a nose-engaging slot, the sides of said slot being adapted to bear on the nose of the wearer of said spectacle, a light-polarizing lens positioned in each of said lens-retaining portions, each of said lenses being adapted to block polarized light transmitted by the other of said lenses, a plurality of temples, and a plurality of hook-like elements structurally integral with the upper part of said lens-retaining portions and extending rearwardly therefrom, said hook elements being adapted to rest upon the upper parts of the eye portions of a second pair of eyeglasses worn by the wearer of said spectacle and to cause the weight of said spectacle to be supported at least in part by said second pair of eyeglasses, the lower side of each of said hook elements being provided with a recess adapted to engage said second pair of eyeglasses and thereby to hold said spectacle and said eyeglasses in readily detachable, substantially rigid relation, said flat construction of said frame member facilitating the mounting of said spectacle and said eyeglasses in close proximity without relative friction.

CLINTON J. T. YOUNG.